United States Patent
Kanaya et al.

(10) Patent No.: US 11,453,768 B2
(45) Date of Patent: Sep. 27, 2022

(54) RESIN COMPOSITION AND MOLDED BODY FORMED THEREFROM

(71) Applicant: MITSUI CHEMICALS, INC., Tokyo (JP)

(72) Inventors: Hirotaka Kanaya, Chiba (JP); Kuniaki Kawabe, Chiba (JP); Yosuke Takahashi, Ichihara (JP); Koji Matsunaga, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 489 days.

(21) Appl. No.: 16/479,875

(22) PCT Filed: Jan. 23, 2018

(86) PCT No.: PCT/JP2018/001911
§ 371 (c)(1),
(2) Date: Jul. 22, 2019

(87) PCT Pub. No.: WO2018/143002
PCT Pub. Date: Aug. 9, 2018

(65) Prior Publication Data
US 2021/0347974 A1    Nov. 11, 2021

(30) Foreign Application Priority Data
Feb. 3, 2017 (JP) .............................. JP2017-018924

(51) Int. Cl.
| C08L 27/06 | (2006.01) |
| B29C 45/00 | (2006.01) |
| B29K 27/06 | (2006.01) |
| C08L 9/00  | (2006.01) |
| C08L 13/00 | (2006.01) |
| C08L 83/04 | (2006.01) |

(52) U.S. Cl.
CPC .......... C08L 27/06 (2013.01); *B29C 45/0001* (2013.01); *B29K 2027/06* (2013.01); *C08L 9/00* (2013.01); *C08L 13/00* (2013.01); *C08L 83/04* (2013.01)

(58) Field of Classification Search
CPC .. C08L 27/06; C08L 9/00; C08L 13/00; C08L 83/04; B29C 45/0001; B29K 2027/06
USPC ........................................................ 524/567
See application file for complete search history.

(56) References Cited

U.S. PATENT DOCUMENTS

| 5,194,471 A | 3/1993 | Hartitz |
| 5,604,278 A | 2/1997 | Hartitz |
| 2002/0147246 A1 | 10/2002 | Takai et al. |

FOREIGN PATENT DOCUMENTS

| JP | H05-132598 A | 5/1993 |
| JP | H05-132603 A | 5/1993 |
| JP | H06-228398 A | 8/1994 |
| JP | 2000-204215 A | 7/2000 |
| JP | 2001-003008 A | 1/2001 |
| JP | 2002-284952 A | 10/2002 |
| JP | 2003-147141 A | 5/2003 |
| JP | 2003-147142 | 5/2003 |
| JP | 2003147142 A | * 5/2003 |
| JP | 2005-194488 A | 7/2005 |
| JP | 2008-274052 A | 11/2008 |
| JP | 2008274052 A | * 11/2008 |

OTHER PUBLICATIONS

International Searching Authority, "International Search Report," issued in connection with International Patent Application No. PCT/JP2018/001911, dated Mar. 20, 2018.
International Searching Authority, "Written Opinion," issued in connection with International Patent Application No. PCT/JP2018/001911, dated Mar. 20, 2018.
Extended European Search Report dated Oct. 19, 2020 for corresponding European Patent Application No. 18748316.9.
FTR-8100.

* cited by examiner

*Primary Examiner* — Ling Siu Choi
*Assistant Examiner* — Ronald Grinsted
(74) *Attorney, Agent, or Firm* — Foley & Lardner LLP

(57) ABSTRACT

A novel vinyl chloride resin composition having exceptional transparency is provided. This resin composition comprises 3-15 parts by mass of a rubbery impact-absorbing material (B) for which the glass transition point in differential scanning calorimetry does not exceed 0° C., and 0.1-10 parts by mass of a lubricant (C) that satisfies (i)-(iv) below, the content amounts above being indicated relative to 100 parts by mass of a vinyl chloride resin (A) having a chlorine content of 55-75 mass %. (i) The melt viscosity at 200° C. is 5-5,000 mPa·s (ii) The softening point is in the range of 60–180° C. (iii) The glass transition point (Tg) as measured in DSC is in the range of 0–100° C. (iv) A structural unit derived from at least one species selected from the group consisting of styrene, α-methylstyrene, indene, vinyl toluene, and isopropenyl toluene is contained in the molecule in an amount of 50-100 mass %

8 Claims, No Drawings

RESIN COMPOSITION AND MOLDED BODY FORMED THEREFROM

RELATED APPLICATIONS

The present application claims priority under 37 U.S.C. § 371 to International Patent Application No. PCT/JP2018/001911, filed Jan. 23, 2018, which claims priority to and the benefit of Japanese Patent Application No. 2017-018924, filed on Feb. 3, 2017. The contents of these applications are hereby incorporated by reference in their entireties.

TECHNICAL FIELD

The present invention relates to a resin composition having a specific composition, and a molded article and pipe joint formed from the composition.

BACKGROUND ART

A vinyl chloride-based resin has excellent mechanical properties, processability and chemical resistance, and is inexpensive as compared with other resins, and therefore is used in a wide range of applications mainly in the field of housing as, for example, a pipe, a joint, a flat plate, a gutter, a sash, and a siding, but polyvinyl chloride (PVC) currently mainly used has low heat resistance and is easily thermally deformed, and hence is limited in usage at a high temperature. Therefore, in order to improve the heat resistance of a vinyl chloride-based resin, a method for subjecting a vinyl chloride-based resin to after-chlorination is generally employed, and the resultant after-chlorinated vinyl chloride-based resin (hereinafter referred to as a chlorinated vinyl chloride-based resin) can be used as a pipe for a fire extinguishing sprinkler and a pipe for hot water supply (see PTLs 1, 2 and 4).

A chlorinated vinyl chloride-based resin is increased in a brittle aspect of the resin and lowered in impact strength as a chlorine content therein is increased. Therefore, in order to increase the impact strength for attaining balance in mechanical properties, it is necessary to add a larger amount of an impact absorber to a chlorinated vinyl chloride-based resin composition than that to a conventional PVC. As the impact absorber, a rubber-based impact absorber having a low grass transition temperature is used. The impact strength of a chlorinated vinyl chloride-based resin is improved in proportion to a ratio of the rubber-based impact absorber in a resin composition, however, when the ratio of the rubber-based impact absorber is excessively large, the heat resistance, that is, a feature of the chlorinated vinyl chloride-based resin, is largely degraded, and the processability is also lowered. Therefore, examinations are being made for various resin compositions sufficient in all of the heat resistance, the mechanical properties and the processability (see PTLs 1 to 4).

CITATION LIST

Patent Literature

PTL 1
  Japanese Patent Application Laid-Open No. H05-132603
PTL 2
  Japanese Patent Application Laid-Open No. 2000-204215
PTL 3
  Japanese Patent Application Laid-Open No. 2002-284952
PTL 4
  Japanese Patent Application Laid-Open No. H06-228398

SUMMARY OF INVENTION

Technical Problem

The resin compositions described in PTLs 1 to 4 are alleged to be sufficient in all of the heat resistance, the mechanical properties and the processability.

Through detailed examinations as to the other properties required of resin compositions for various applications, the present inventors have come up with the idea that when the transparency of chlorinated vinyl chloride resins, which have excellent mechanical properties (in particular, impact resistance), can be enhanced, the enhanced transparency will offer an advantage in that when, for example, the vinyl chloride resins are formed into joints for various pipes, the joints allow easy visual check of how an adhesive is applied or how pipes are joined. An object of the present invention is therefore to provide a new vinyl chloride-based resin composition excellent in transparency and a molded article, a pipe joint in particular, formed from the resin composition.

Solution to Problem

The present inventors made earnest studies to solve the above-described problem, and have found that the problem can be solved by using a resin composition having a specific composition, resulting in completing the present invention.

More specifically, the present invention relates to [1] to [9] below.

[1] A resin composition, comprising 3 to 15 parts by mass of rubber-based impact absorber (B) and 0.1 to 10 parts by mass of lubricant (C) with respect to 100 parts by mass of vinyl chloride-based resin (A), and satisfying the following requirements (I) to (III):
  (I) the vinyl chloride-based resin (A) has a chlorine content of 55 to 75 mass %;
  (II) the rubber-based impact absorber (B) has a glass transition temperature (Tg), measured by differential scanning calorimetry (DSC), of 0° C. or less; and
  (III) the lubricant (C) satisfies the following requirements (i) to (iv):
  (i) a melt viscosity at 200° C. is 5 to 5,000 mPa·s;
  (ii) a softening point is in a range of 60 to 180° C.;
  (iii) a glass transition temperature (Tg) measured with a differential scanning calorimeter (DSC) is in a range of 0 to 100° C.; and
  (iv) in a molecule, a structural unit derived from at least one selected from the group consisting of styrene, α-methylstyrene, indene, vinyltoluene, and isopropenyltoluene is contained in an amount of 50 to 100 mass %.

[2] The resin composition according to [1], wherein the chlorine content in the vinyl chloride-based resin (A) is 60 to 75 mass % in the requirement (I).

[3] The resin composition according to [1] or [2], wherein the rubber-based impact absorber (B) contains a rubber component selected from a butadiene rubber, an acrylic rubber and a silicone rubber.

[4] The resin composition according to any one of [1] to [3], wherein a content of the lubricant (C) is 0.1 to 3 parts by mass with respect to 100 parts by mass of the vinyl chloride-based resin (A).

[5] The resin composition according to any one of [1] to [4], wherein the melt viscosity at 200° C. is 5 to 2,000 mPa·s in the requirement (i) as to the lubricant (C).

[6] The resin composition according to any one of [1] to [5], wherein a ratio of a density of the vinyl chloride-based resin (A) to a density of the lubricant (C) ((A)/(C)) is 1.70 or less, and a ratio of a density of the rubber-based impact absorber (B) to the density of the lubricant (C) ((B)/(C)) is 1.05 or less.

[7] A molded article formed from the resin composition according to any one of [1] to [6].

[8] The molded article according to [7], wherein the molded article is an injection-molded article.

[9] The molded article according to [7] or [8], wherein the molded article is a pipe joint.

[10] The molded article according to any one of [7] to [9], wherein the molded article has a minimum thickness of 1 mm or more.

Advantageous Effects of Invention

According to the present invention, a vinyl chloride-based resin composition excellent in transparency and a molded article, a pipe joint in particular, formed from the resin composition can be provided.

DESCRIPTION OF EMBODIMENTS

A resin composition of the present invention and molded articles formed from the resin composition will now be described in detail. Molded articles of the present invention include a pipe joint.

A. Resin Composition

The resin composition of the present invention contains vinyl chloride-based resin (A), rubber-based impact absorber (B), and lubricant (C).

The amount of rubber-based impact absorber (B) is 3 to 15 parts by mass, preferably 4 to 14 parts by mass, more preferably 5 to 13 parts by mass, and particularly preferably 6 to 12 parts by mass based on 100 parts by mass of vinyl chloride-based resin (A). The amount of lubricant (C) is 0.1 to 10 parts by mass, preferably 0.1 to 5 parts by mass, more preferably 0.1 to 3 parts by mass, particularly preferably 0.1 to 2 parts by mass, and further particularly preferably 0.5 to 2 parts by mass based on 100 parts by mass of vinyl chloride-based resin (A).

When vinyl chloride-based resin (A) and rubber-based impact absorber (B) are contained in the above-described ratio, the resin composition is excellent in balance between the impact resistance and the heat resistance. Specifically, vinyl chloride-based resin (A) is increased in a brittle aspect and is more easily broken by external force in proportion to a chlorine content therein, but is increased in a tough aspect and is more difficult to be broken by external force in proportion to the content of rubber-based impact absorber (B). Many of rubber-based impact absorbers (B) generally have an intramolecular unsaturated bond in a rubber component, and hence are easily colored through thermal degradation in proportion to the content thereof. On the contrary, when vinyl chloride-based resin (A) and rubber-based impact absorber (B) are contained in the above-described ratio, the resultant resin composition is preferably excellent in the balance between the impact resistance and the heat resistance.

The ratio of the density of vinyl chloride-based resin (A) to the density of lubricant (C) ((A)/(C)) is preferably 1.70 or less, more preferably 1.65 or less, and particularly preferably 1.55 or less. The ratio of the density of rubber-based impact absorber (B) to the density of lubricant (C) ((B)/(C)) is preferably 1.05 or less, more preferably 1.00 or less, and particularly preferably 0.95 or less. When the density ratios fall within the above ranges, the resin composition has excellent transparency.

The respective components and requirements will now be described.

1. Vinyl Chloride-based Resin (A)

Vinyl chloride-based resin (A) has a chlorine content of 55 to 75 mass %, preferably 57 to 75 mass %, more preferably 60 to 75 mass %, and particularly preferably 63 to 75 mass %. When the chlorine content in vinyl chloride-based resin (A) is 55 mass % or more, a resin composition having sufficient heat resistance can be obtained. When the chlorine content is 75 mass % or less, a resin composition having not too high melt viscosity but good processability can be obtained. The chlorine content can be measured according to ISO 1158.

Vinyl chloride-based resin (A) has an average degree of polymerization of preferably 600 to 1,500, more preferably 600 to 1,300, and further preferably 600 to 1,200. When the average degree of polymerization of vinyl chloride-based resin (A) is 600 or more, a resin composition having more sufficient mechanical strength can be obtained. When the average degree of polymerization is 1,500 or less, a resin composition having not too high melt viscosity but good processability can be obtained. The average degree of polymerization can be measured according to JIS K6720-2.

The density of vinyl chloride-based resin (A) is preferably 1,300 to 1,900 kg/m$^3$, more preferably 1,400 to 1,800 kg/m$^3$, and further preferably 1,500 to 1,700 kg/m$^3$. When the density of vinyl chloride-based resin (A) falls within the above range, a resin composition having more sufficient heat resistance and mechanical strength can be obtained. The density can be measured according to JIS K7112.

As vinyl chloride-based resin (A), for example, not only homopolymers, such as polyvinyl chloride and polyvinylidene chloride, but also copolymers, such as a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride copolymer, a vinyl chloride-styrene-acrylonitrile copolymer, a vinyl chloride-butadiene copolymer, a vinyl chloride-vinylidene chloride-vinyl acetate copolymer, a vinyl chloride-acrylic acid ester copolymer, a vinyl chloride-maleic acid ester copolymer, a vinyl chloride-methacrylic acid ester copolymer, a vinyl chloride-acrylonitrile copolymer, and a polymer of internally plasticized polyvinyl chloride or the like, can be used. Alternatively, what is called an after-chlorinated vinyl chloride-based resin obtained through after-chlorination of any of these can be used. One of these may be singly used, or two or more of these may be used in combination. Besides, when vinyl chloride-based resin (A) is a copolymer, contents of structural units derived from respective monomers therein are not especially limited as long as the chlorine content falls in the above-described range.

2. Rubber-based Impact Absorber (B)

Rubber-based impact absorber (B) has a glass transition temperature (Tg) measured by differential scanning calorimetry (DSC) of 0° C. or less, preferably −20° C. or less, more preferably −40° C. or less, and particularly preferably −60° C. or less. When the Tg of rubber-based impact absorber (B) is 0° C. or less, a resin composition having sufficient impact resistance can be obtained.

Rubber-based impact absorber (B) has a melt flow rate (MFR), measured according to JIS K7210-1 at a temperature of 200° C. under a load of 5 kgf, of preferably 0.1 to 70 g/10 min, more preferably 0.3 to 60 g/10 min, and further preferably 0.5 to 50 g/10 min. When the MFR of rubber-based impact absorber (B) falls in the above-described range, a resin composition having more sufficient impact resistance can be preferably obtained.

Rubber-based impact absorber (B) has a density, measured by a density-gradient tube method, of preferably 900 to 1,200 kg/m$^3$, more preferably 920 to 1,100 kg/m$^3$, and further preferably 930 to 1,050 kg/m$^3$. When the density of rubber-based impact absorber (B) falls in the above-described range, a resin composition having more sufficient impact resistance can be preferably obtained.

The Tg of rubber-based impact absorber (B) is not especially limited as long as it is 0° C. or less, and a butadiene rubber, an acrylic rubber or a silicone rubber is preferably contained as a rubber component. Besides, the rubber component preferably contains a structural unit derived from a functional group-containing olefin monomer. It is particularly preferable for the rubber component to be particles in which the concentration of a structural unit derived from a functional group-containing olefin monomer is higher in the vicinity of the surfaces of the particles than in the other portions of the particles. When rubber-based impact absorber (B) contains a structural unit derived from a functional group-containing olefin monomer, affinity between vinyl chloride-based resin (A) and the rubber component contained in rubber-based impact absorber (B) is increased, and hence, a resin composition having sufficient impact resistance can be obtained.

Examples of a functional group of the functional group-containing olefin monomer include a group containing an aromatic ring, and a group containing a group 15 to 17 element. Specific examples include an aromatic hydrocarbon group having 6 to 20 carbon atoms, a nitrile group, an ester group, a carboxyl group, a ketone group, an aldehyde group, an ether group, an amide group, an imide group, and a halogen atom, among which an aromatic hydrocarbon group having 6 to 20 carbon atoms, a nitrile group, an ester group and a carboxyl group are preferred.

As the functional group-containing olefin monomer, for example, an aromatic vinyl compound such as styrene, α-methylstyrene, para-methylstyrene, chlorostyrene, bromostyrene, dibromostyrene, tribromostyrene, vinyl naphthalene, isopropenyl naphthalene, or divinylbenzene; a cyanated vinyl compound such as (meth)acrylonitrile; an unsaturated carboxylic acid (anhydride) such as (meth)acrylic acid or maleic anhydride; and an α,β-unsaturated carboxylic acid ester such as an alkyl ester (meth)acrylate including an acrylic acid alkyl ester of methyl, ethyl, propyl or butyl can be used.

As rubber-based impact absorber (B), for example, an acrylonitrile-butadiene-styrene copolymer (ABS, Tg: −80° C.), a methyl methacrylate-butadiene-styrene copolymer (MBS, TG: −80° C.), an alkyl methacrylate-styrene copolymer (MS, Tg: −42° C.), an alkyl methacrylate-polydimethylsiloxane-styrene copolymer (Tg: −125° C.), an acrylonitrile-butadiene rubber (NBR, Tg: −85° C.), a styrene-butadiene copolymer (SBR, Tg: −80° C.), a hydrogenated styrene-butadiene-styrene copolymer (SEBS, Tg: −80° C.) or the like can be used.

3. Lubricant (C)

The resin composition of the present invention may comprise only one lubricant as lubricant (C) or may comprise two or more lubricants as lubricant (C).

Lubricants are materials that can, when mixed with a high-molecular-weight compound, impart flowability to a melt of the mixture. In general, lubricants are oligomers having a molecular weight of several hundreds to several tens of thousands and having a softening point of about 60 to 160° C.

Specific examples of lubricant (C) include natural rosin, modified rosin, polyterpene-based resins, synthetic petroleum resins, coumarone-based resins, phenol-based resins, xylene-based resins, styrene-based resins, and isoprene-based resins.

More specific examples of lubricant (C) include:

aliphatic hydrocarbon resins whose main raw material is a $C_4$ or $C_5$ fraction obtained by decomposition of petroleum, naphtha, and the like., a mixture of these fractions, or any component contained in these fractions (such as isoprene and 1,3-pentadiene in the $C_5$ fraction);

aromatic hydrocarbon resins whose main raw material is a styrene derivative or an indene compound contained in a $C_9$ fraction obtained by decomposition of petroleum, naphtha, and the like;

aliphatic-aromatic copolymer hydrocarbon resins produced by copolymerization of any component contained in $C_4$ and $C_5$ fractions and any component contained in a $C_9$ fraction;

alicyclic hydrocarbon resins produced by hydrogenation of aromatic hydrocarbon resins;

synthetic terpene-based hydrocarbon resins comprising aliphatic, alicyclic, and aromatic hydrocarbon resins;

terpene-based hydrocarbon resins whose raw material is α,β-pinene contained in oil of turpentine;

coumarone-indene-based hydrocarbon resins whose raw materials are indene and styrene compounds contained in coal-tar naphtha;

low-molecular-weight styrene-based resins; and rosin-based hydrocarbon resins.

Alternatively, lubricant (C) may be a product as disclosed in Japanese Patent Application Laid-Open No. 2005-194488, namely a product obtained by copolymerization of a plurality of monomers selected from terpene-based monomers, coumarone-based monomers, styrene-based monomers, and phenol-based monomers.

Lubricant (C) satisfies the following requirements (i) to (iv).

Requirement (i): A melt viscosity at 200° C. is 5 to 5,000 mPa·s.

The melt viscosity at 200° C. of lubricant (C) is preferably 5 to 2,000 mPa·s, more preferably 10 to 500 mPa·s, and particularly preferably 30 to 200 mPa·s.

When the melt viscosity at 200° C. of lubricant (C) falls within the above range, lubricant (C) is easily compatible with vinyl chloride-based resin (A). Thus, a resin composition having more sufficient transparency and heat resistance is obtained due to lubricant (C) being more uniformly dispersed in the resin composition. Additionally, the molding processability of the resin composition, in particular the kneading property and the molding processability in injection molding, can be improved.

Requirement (ii): A softening point measured according to JIS K2207 is in a range of 60 to 180° C.

The softening point of lubricant (C) is preferably 100 to 160° C. and more preferably 110° C. to 150° C. When the softening point of lubricant (C) falls within the above range, lubricant (C) is easily compatible with vinyl chloride-based resin (A) and more uniformly dispersed. Thus, lubricant (C) having such a softening point is preferred in that a resin composition having more sufficient impact resistance and excellent processability can be obtained.

Requirement (iii): A glass transition temperature (Tg) measured with a differential scanning calorimeter (DSC) is in a range of 0 to 100° C.

The glass transition temperature (Tg) of lubricant (C) is preferably 20 to 95° C., more preferably 40 to 90° C., and further preferably 50 to 85° C. The glass transition temperature (Tg) of lubricant (C) being equal to or higher than the above lower limit is preferred in terms of improvement in the heat resistance of the resin composition, and the glass transition temperature (Tg) being equal to or lower than the above upper limit is preferred in terms of processability during compounding of the resin composition.

Requirement (iv): In the molecule, a structural unit derived from at least one selected from the group consisting of styrene, α-methylstyrene, indene, vinyltoluene, and isopropenyltoluene is contained in an amount of 50 to 100 mass %.

The content of the structural unit derived from at least one selected from the above group is preferably 60 to 100 mass % and more preferably 80 to 100 mass %. When lubricant (C) contains a plurality of structural units derived from two or more selected from the above group, the above-specified content refers to the total content of the plurality of structural units.

When lubricant (C) has the above-described structural unit in the molecule, the flowability of vinyl chloride-based resin (A) is improved, and the rubber-based impact modifier (B) is likely to be finely dispersed. Additionally, lubricant (C) is hardly crystallized, and light scattering rarely occurs at the interface with vinyl chloride-based resin (A) which is an amorphous resin, so that the transparency is maintained. Furthermore, when a structural unit derived from at least one selected from the group consisting of styrene, α-methylstyrene, indene, vinyltoluene, and isopropenyltoluene is contained in an amount of 50 to 100 mass % in the molecule of lubricant (C), lubricant (C) has a refractive index close to that of vinyl chloride-based resin (A), and the occurrence of light scattering at the interface is reduced, so that the transparency is maintained.

The content of each structural unit can be calculated from the proportion of the amount of the corresponding monomer supplied for polymerization to the total amount of the supplied monomers. The content of each structural unit of lubricant (C) can be calculated also from the intensity ratio between a peak attributed to ethylene and a peak attributed to styrene in the analysis of a $^{13}$C-NMR spectrum.

It is preferable for lubricant (C) to further satisfy physical property requirements described below.

Lubricant (C) has a density, measured by a density-gradient tube method, of preferably 900 to 1,200 kg/m$^3$, more preferably 950 to 1,150 kg/m$^3$, further preferably 1,000 to 1,130 kg/m$^3$, particularly preferably 1,010 to 1,100 kg/m$^3$. When the density falls within the above range, lubricant (C) is easily compatible with vinyl chloride-based resin (A) and more uniformly dispersed. Consequently, a resin composition excellent in transparency is obtained.

Lubricant (C) has a number-average molecular weight (Mn), measured by gel permeation chromatography (GPC) in terms of polystyrene, of preferably 500 to 2,500, more preferably 600 to 2,300. The number-average molecular weight is further preferably 700 to 2,000. The weight-average molecular weight (Mw) of lubricant (C) is preferably 800 to 4,000 and more preferably 900 to 3,800. The weight-average molecular weight is further preferably 1,000 to 3,500. Further, the ratio of the weight-average molecular weight to the number-average molecular weight (Mw/Mn) is preferably 1.1 to 2.5 and more preferably 1.2 to 2.0. Mw/Mn is further preferably 1.3 to 1.9. When the number-average molecular weight and weight-average molecular weight of lubricant (C) fall within the above ranges, the resin composition has an improved flowability and hence an enhanced molding processability.

Lubricant (C) has an degree of unsaturation (the ratio of the amount of hydrogen on unsaturated bonds to total hydrogen amount), measured by proton nuclear magnetic resonance ($^1$H-NMR), of preferably 0.10 to 0.80, more preferably 0.15 to 0.60, further preferably 0.18 to 0.40. When the degree of unsaturation of lubricant (C) falls within the above range, the compatibility among vinyl chloride-based resin (A), rubber-based impact absorber (B), and lubricant (C) is improved, so that the transparency is enhanced.

(Production Method for Lubricant (C))

Lubricant (C) can be produced by a known method. Exemplary methods include: a method in which at least one monomer selected as a raw material from the group consisting of styrene, α-methylstyrene, indene, vinyltoluene, and isopropenyltoluene is homopolymerized or two or more monomers selected from this group are copolymerized; and a method in which any of these monomers and another monomer (such as a vinyl aromatic compound other than the above monomers or an unsaturated aliphatic compound) are copolymerized.

Examples of the vinyl aromatic compound used as the other monomer in the above-mentioned method include styrene-based monomers such as substituted styrene having a substituent on the aromatic ring and substituted α-methylstyrene having a substituent on the aromatic ring. Examples of the substituent include an alkyl group having 1 to 20 carbon atoms, an alkoxy group having 1 to 20 carbon atoms, an aryl group having 6 to 20 carbon atoms, and a halogen atom.

Specific examples of the substituted styrene include methylstyrene (except for α-methyl styrene), ethyl styrene, 2,4-dimethyl styrene, p-n-butyl styrene, p-tert-butylstyrene, p-n-hexyl styrene, p-n-octylstyrene, p-n-nonylstyrene, p-n-decylstyrene, p-n-dodecyl styrene, p-methoxy styrene, p-phenyl styrene, p-chlorostyrene, and 3,4-dichlorostyrene.

Specific examples of the unsaturated aliphatic compound used as the other monomer include an unsaturated aliphatic hydrocarbon having 4 to 5 carbon atoms. As the unsaturated aliphatic hydrocarbon having 4 to 5 carbon atoms there can be used any compound selected from $C_4$ and $C_5$ fractions produced as by-products during refining and decomposition of petroleum and containing, as a main component, an unsaturated aliphatic hydrocarbon having 4 to 5 carbon atoms. The use of these compounds with styrene or the like makes it possible to adjust the various physical properties such as softening point of lubricant (C) in accordance with, for example, the intended application.

The $C_4$ and $C_5$ fractions are fractions which generally have a boiling point of −15 to +45° C. at ordinary pressure and contain polymerizable monomers such as 1-butene, isobutene, 2-butene, 1,3-butadiene, 1-pentene, 2-methyl-1-butene, 3-methyl-1-butene, 2-pentene, isoprene, 1,3-pentadiene, and cyclopentadiene. Any polymerizable monomer selected from the $C_4$ and $C_5$ fractions can be used as the above unsaturated aliphatic compound. However, it is preferable for the unsaturated aliphatic compound to have no conjugated double bond or have a low conjugated double bond content. Specifically, it is preferable for the unsaturated aliphatic compound to be free of 1,3-butadiene, isoprene, 1,3-pentadiene, and cyclopentadiene or have a low content of these polymerizable monomers.

The petroleum fractions as described above can be obtained directly from the following petroleum fractions or may be obtained as desired fractions by further performing processes such as distillation and extraction: a light oil fraction produced as a by-product during distillation at ordinary pressure (topping) of crude oil or the like in a refinery or the like and containing gas fractions; a similar light oil fraction produced as a by-product during cracking and reforming processes of petroleum; and a light oil fraction produced during petroleum naphtha decomposition or the like in a petrochemical plant and containing gases.

The homopolymerization or copolymerization reaction of the monomers selected from the above-described group, the copolymerization reaction of any of the monomers with another monomer and the like are typically carried out as cation polymerization, in particular in the presence of a Friedel-Crafts catalyst. The Friedel-Crafts catalyst used can be a known Friedel-Crafts catalyst, specific examples of which include aluminum chloride, aluminum bromide, dichloromonoethylaluminum, titanium tetrachloride, tin tetrachloride, boron trifluoride, and various complexes such as an ether complex and a phenol complex of boron trifluoride. Among these, a phenol complex of boron trifluoride is preferably used. The amount of the Friedel-Crafts catalyst used is generally 0.05 to 5 parts by mass and preferably 0.1 to 2 parts by mass with respect to 100 parts by mass of the total monomers used as the raw materials.

For removal of reaction heat generated during the polymerization reaction, control of the reaction liquid viscosity, and adjustment of the molecular weight, the polymerization reaction is preferably carried out using a solvent in such an amount that the concentration of the polymerizable monomer as a raw material is about 10 to 60 mass %. Examples of suitable solvents include: aliphatic hydrocarbons such as pentane, hexane, heptane, and octane; alicyclic hydrocarbons such as cyclopentane, cyclohexane, and methylcyclohexane; and aromatic hydrocarbons such as toluene, xylene, ethylbenzene, and mesitylene. These may be used alone or in combination.

In the polymerization step, the polymerizable monomer as a raw material is placed in a reactor and reacted in the above-described solvent in the presence of the above-described catalyst. It is preferable that the polymerization step be performed in several stages, although the polymerization step may be performed in one stage. The polymerization temperature may vary depending on, for example, the raw material proportions or the intended molecular weight region and is generally preferably in a range of −50 to +50° C. The reaction time is generally preferably in a range of 10 minutes to 10 hours. Completion of the polymerization is followed by decomposition of the catalyst with a basic aqueous solution or a basic compound as exemplified by an alcohol such as methanol, then by washing with water, and then by stripping and removal of the unreacted raw material, solvent and the like. Thus, lubricant (C) as a target product is obtained.

Lubricant (C) may be in the form of a solid such as a powder, tablet, or block or may be in the form of being dispersed or dissolved in a solvent.

4. Another Resin

The resin composition of the present invention may further contain another resin in addition to (A) to (C) described above as long as the effect of the present invention is not significantly impaired. The content of the other resin is not particularly limited and is preferably about 0.1 to 30 parts by mass with respect to 100 parts by mass of (A).

5. Other Additives

The resin composition of the present invention may contain, as other additives, additives known in the field of vinyl chloride-based resins, and examples include a nucleating agent, an anti-blocking agent, fiber, a filling agent, a filler, a pigment, a dye, a lubricant (except for those corresponding to (C) described above), a plasticizer, a releasing agent, an antioxidant, a flame retardant, a UV absorber, an antibacterial agent, a surfactant, an antistatic agent, a weathering stabilizer, a heat stabilizer, an anti-slipping agent, a foaming agent, a crystallization auxiliary agent, an anti-fogging agent, an anti-aging agent, a hydrochloric acid absorber, an impact modifier, a crosslinking agent, a co-crosslinking agent, a crosslinking auxiliary agent, an adhesive, a softening agent, and a processing auxiliary agent.

One of these additives may be used singly, or two or more of these may be used in combination. The content of such an additive is not especially limited but may be set in accordance with application unless the object of the present invention is impaired, and the content of each additive to be blended is preferably about 0.05 to 70 parts by mass with respect to 100 parts by mass of vinyl chloride-based resin (A). The upper limit of the content is more preferably 30 parts by mass.

Examples of the fiber include glass fiber, carbon fiber, natural fiber (such as wood flour, wood fiber, bamboo, cotton, cellulose, and nano-cellulose fiber), and agricultural product fiber (such as straw, hemp, flax, kenaf, kapok, jute, rumie, sisal hemp, henequen, corn fiber or coir, and nut shell or chaff). Examples of the filling agent include lignin, starch, and a product containing any of these.

The type of the glass fiber is not especially limited, and roving glass, chopped strand glass, milled glass and the like can be used. Besides, one of these may be used or a mixture of two or more of these may be used.

As the filler, amorphous fillers such as calcium carbonate, silica, kaolin, clay, titanium oxide, barium sulfate, zinc oxide, aluminum hydroxide, alumina, and magnesium hydroxide, plate-shaped fillers such as talc, mica, and glass flake, needle-shaped fillers such as wollastonite, potassium titanate, basic magnesium sulfate, sepiolite, xonotlite, and aluminum borate, and fillers such as metal powders and metal flakes are used. In addition, a glass bead, a glass powder and the like are used. One of these filers may be singly used, a plurality of these may be used in combination, or one of or a combination of a plurality of these having been subjected to carbon coating or silane coupling treatment may be used.

Examples of the pigment include an inorganic pigment (such as titanium oxide, iron oxide, chromium oxide, or cadmium sulfate), and an organic pigment (such as azo lake, thioindigo, phthalocyanine, or anthraquinone pigment). Examples of the dye include azo, anthraquinone, and triphenylmethane dyes. An addition amount of such a pigment or dye is not especially limited, and is usually 5 parts by mass or less, and preferably 0.1 to 3 parts by mass in total with respect to 100 parts by mass of vinyl chloride-based resin (A).

Examples of the lubricant include waxes except for lubricant (C) (such as unmodified polyethylene wax, unmodified polypropylene wax, vaseline, tall oil, castor oil, rapeseed oil, soybean oil, palm oil, beeswax, paraffin wax, liquid paraffin, carnauba wax, montanic acid wax, and microcrystalline wax), a higher fatty acid (such as stearic acid) and a metal salt thereof (such as zinc stearate or calcium stearate), a higher alcohol (such as stearyl alcohol) and an ester thereof (such as butyl stearate), a higher fatty acid amide (such as stearic acid amide), a process oil, and various lubricants. As a lubricant, for example, Mitsui Hi Wax (manufactured by Mitsui Chemicals Inc.) is used. The lubricant is used in a ratio of preferably 0.05 to 5 parts by mass with respect to 100 parts by mass of vinyl chloride-based resin (A).

Examples of the plasticizer include an aromatic carboxylic acid ester (such as dibutyl phthalate), an aliphatic carboxylic acid ester (such as methyl acetyl ricinoleate), an aliphatic dicarboxylic acid ester (such as adipic acid-propylene glycol-based polyester), an aliphatic tricarboxylic acid ester (such as triethyl citrate), a phosphoric acid triester (such as triphenyl phosphate), an epoxy fatty acid ester (such as epoxy butyl stearate), and a petroleum resin.

As the antioxidant, a known antioxidant can be used. Specific examples include phenol-based (such as 2,6-di-t-butyl-4-methylphenol), polycyclic phenol-based (such as 2,2'-methylenebis(4-methyl-6-t-butylphenol), phosphorus-based (such as tetrakis(2,4-di-t-butylphenyl)-4,4-biphenylene diphosphonate), sulfur-based (such as dilauryl thiodipropionate), amine-based (such as N,N-diisopropyl-p-phenylenediamine), and lactone-based antioxidants.

Examples of the flame retardant include an organic flame retardant (such as nitrogen-containing, sulfur-containing, silicon-containing or phosphorus-containing flame retardant), and an inorganic flame retardant (such as antimony trioxide, magnesium hydroxide, zinc borate, or red phosphorus).

Examples of the UV absorber include benzotriazole-based, benzophenone-based, salicylic acid-based, and acrylate-based UV absorbers.

Examples of the antibacterial agent include a quaternary ammonium salt, a pyridine-based compound, an organic acid, an organic acid ester, halogenated phenol, and organic iodine.

Examples of the surfactant include nonionic, anionic, cationic, and amphoteric surfactants. Examples of the nonionic surfactant include a polyethylene glycol type nonionic surfactant such as a higher alcohol ethylene oxide adduct, a fatty acid ethylene oxide adduct, a higher alkylamine ethylene oxide adduct, or a polypropylene glycol ethylene oxide adduct, and a polyhydric alcohol type nonionic surfactant such as polyethylene oxide, a fatty acid ester of glycerin, a fatty acid ester of pentaerythritol, a fatty acid ester of sorbit or sorbitan, an alkyl ether of a polyhydric alcohol, or an aliphatic amide of alkanolamine. Examples of the anionic surfactant include a sulfuric acid ester such as an alkali metal salt of a higher fatty acid, a sulfonic acid salt such as an alkylbenzene sulfonic acid salt, an alkyl sulfonic acid salt, or a paraffin sulfonic acid salt, and a phosphoric acid ester salt such as a higher alcohol phosphoric acid ester salt. An example of the cationic surfactant includes a quaternary ammonium salt such as an alkyl trimethyl ammonium salt. Examples of the amphoteric surfactant include an amino acid type amphoteric surfactant such as a higher alkyl aminopropionic acid salt, and a betaine type amphoteric surfactant such as higher alkyl dimethyl betaine, or a higher alkyl dihydroxyethyl betaine.

Examples of the antistatic agent include the above-described surfactants, a fatty acid ester, and a polymer type antistatic agent. An example of the polymer type antistatic agent includes a polyether-ester amide.

As the crosslinking agent, for example, an organic peroxide is used. Examples of the organic peroxide include dicumyl organic peroxide, di-tert-butyl organic peroxide, 2,5-dimethyl-2,5-di-(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy) valerate, benzoyl organic peroxide, p-chlorobenzoyl peroxide, 2,4-dichlorobenzoyl organic peroxide, tert-butyl peroxybenzoate, tert-butyl perbenzoate, tert-butylperoxy isopropyl carbonate, diacetyl organic peroxide, lauroyl organic peroxide, and tert-butyl cumyl organic peroxide.

Among these, from the viewpoint of odor and scorch stability, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3, 3,5-trimethylcyclohexane, and n-butyl-4,4-bis(tert-butylperoxy)valerate are more suitably used, and 1,3-bis (tert-butylperoxyisopropyl)benzene is further suitably used.

The organic peroxide is used in a ratio of preferably 0.05 to 10 parts by mass with respect to 100 parts by mass of vinyl chloride-based resin (A).

In performing a crosslinking treatment with the organic peroxide, a peroxy crosslinking auxiliary agent such as sulfur, p-quinone dioxime, p,p'-dibenzoylquinone dioxime, N-methyl-N-4-dinitrosoaniline, nitrosobenzene, diphenyl guanine, or trimethylolpropane-N,N'-m-phenylenedimaleimide; a polyfunctional methacrylate monomer such as divinyl benzene, triallyl cyanurate, ethylene glycol dimethacrylate, diethylene glycol dimethacrylate, polyethylene glycol dimethacrylate, trimethylolpropane trimethacrylate, or allyl methacrylate; or a polyfunctional vinyl monomer such as vinyl butyrate, or vinyl stearate can be blended as the crosslinking auxiliary agent.

When any of the above-described compounds is used, a homogeneous and mild crosslinking reaction can be expected to be performed. In particular, in the present invention, divinyl benzene is suitably used. Divinyl benzene is easy to handle, has good compatibility with a polymer, has an effect to solubilize the organic peroxide, and works as a dispersant for the organic peroxide. Therefore, a homogeneous crosslinking effect can be obtained, and a dynamic heat treated product well balanced in flowability and physical properties can be obtained. The crosslinking auxiliary agent is used in a ratio of preferably 0.05 to 10 parts by mass with respect to 100 parts by mass of vinyl chloride-based resin (A).

Examples of the softening agent include a coal tar-based softening agent such as coal tar or coal tar pitch, a synthetic polymeric substance such as atactic polypropylene, an ester-based plasticizer such as dioctyl phthalate, dioctyl adipate or dioctyl sebacate, and a carbonic acid ester-based plasticizer such as diisododecyl carbonate.

The amount of the softening agent is not especially limited, and is preferably an amount corresponding to 1 to 200 parts by mass with respect to 100 parts by mass of vinyl chloride-based resin (A). The softening agent makes processing easy in preparing the resin composition as well as aids dispersion of carbon black or the like.

6. Physical Properties, Etc.

The resin composition of the present invention has a melt flow rate (MFR), measured according to JIS K7210-1 at a temperature of 200° C. under a testing load of 5 kgf, of preferably 0.01 to 100 g/10 min, more preferably 0.1 to 95 g/10 min, further preferably 1 to 90 g/10 min, particularly preferably 10 to 85 g/10 min, and further particularly preferably 20 to 80 g/10 min. When the MFR of the resin composition falls in the above-described range, the resin composition is excellent in balance among the impact resistance, the processability and the heat resistance.

The resin composition of the present invention has a transparency (haze), measured with a haze meter, of preferably 25%/3 mm or less, more preferably 23%/3 mm or less, further preferably 20%/3 mm or less. When the resin composition having a transparency falling within the above range is formed into a pipe joint, this pipe joint allows easy visual check of how an adhesive is applied or how pipes are joined.

The resin composition of the present invention has an IZOD impact strength, measured according to ASTM D256 (method A), of preferably 20 J/m or more, more preferably 25 J/m or more, further preferably 30 J/m or more. When the impact resistance of the resin composition falls within the above range, a good balance is achieved between the impact resistance and processability.

7. Production Method for Resin Composition

The resin composition of the present invention can be produced by dry blending or melt blending by employing any of various optional methods. As a specific method, for example, a method in which vinyl chloride-based resin (A), rubber-based impact absorber (B), lubricant (C) and another optional component are blended simultaneously or in an optional order by using a tumbler, a V-blender, a Nauta mixer, a banbury mixer, a kneading roll, a single or double screw extruder or the like is appropriately employed. Alternatively, vinyl chloride-based resin (A), rubber-based impact absorber (B), lubricant (C) and another optional component may be blended by once dispersing or dissolving in an optional solvent, and drying the resultant by an appropriate method such as natural drying, or forced drying by heating.

B. Molded Article and Pipe

The molded article of the present invention is formed from the resin composition. The molded article of the present invention can be obtained by molding the resin composition into a desired shape by a known method, such as extrusion molding, compression molding, or injection molding. Examples of the molded article of the present invention include a pipe, a joint, a flat plate, a gutter, a sash, a siding, a sheet, a card, a cable connector component, and a molded article for a flange, and since the resin composition is excellent in transparency, it is particularly preferably used for producing a pipe joint. The pipe joint can be formed typically by injection molding. Specific examples of application to a pipe include a pipe for a fire extinguishing sprinkler and a pipe for hot water supply.

Although the shape of the molded article is not particularly limited, the use of the resin composition for forming a molded article having a minimum thickness of 1 mm or more is preferred because in this case the transparency of the molded article is further enhanced.

EXAMPLES

The present invention will now be described in detail on the basis of examples, and it is noted that the present invention is not limited to these examples.

1. Vinyl Chloride-based Resin (A)

As vinyl chloride-based resin (A), H727 manufactured by Kaneka Corporation (chlorine content: 67 mass %, Vicat softening temperature: 120° C., deflection temperature under load: 107° C., density: 1570 kg/m$^3$) was used. It is noted that these physical properties were measured respectively under the following conditions:

<Chlorine Content>

The chlorine content was measured according to ISO 1158.

<Vicat Softening Temperature>

The Vicat softening temperature was measured according to ASTM D1525.

<Deflection Temperature Under Load>

The deflection temperature under load was measured according to ASTM D648.

<Density>

The density was measured according to JIS K7112 (density-gradient tube method).

2. Rubber-Based Impact Absorber (B)

Kane ace (trade name) B513 manufactured by Kaneka Corporation (MBS-based polymer, glass transition temperature: −80° C., MFR: 20 g/10 min, density: 1000 kg/m$^3$) was used. It is noted that these physical properties were measured respectively under the following conditions:

<Glass Transition Temperature>

The glass transition temperature was measured with a differential scanning calorimeter (DSC).

The measurement method is as follows. A differential scanning calorimeter (X-DSC7000) manufactured by SII calibrated with an indium standard is used. A measurement sample is weighed into an aluminum DSC pan in an amount of about 10 mg. A lid is crimped on the pan to obtain a closed atmosphere, and thus, a sample pan is obtained. The sample pan is placed in a DSC cell, and an empty aluminum pan is placed as a reference. A temperature of the DSC cell is increased from 30° C. (room temperature) to 150° C. at a rate of 10° C./min under a nitrogen atmosphere (first temperature increase step). Next, the temperature is retained at 150° C. for 5 minutes, and then, is reduced at a rate of 10° C./min, so as to cool the DSC cell to −100° C. (temperature reduction step). A glass transition temperature (Tg) is defined as an intersection point between a tangent line on an inflection point of an enthalpy curve (i.e., a point on which a curve convex upward is changed to a curve convex downward) obtained through the temperature reduction step and an endothermic amount obtained when the temperature has been retained.

<MFR>

The MFR was measured according to ISO 1133 (temperature: 200° C., load: 5 kg).

<Density>

The density was measured according to JIS K7112 (density-gradient tube method).

3. Lubricant (C)

As lubricant (C) there were used C1 to C3 and W1 shown in Table 1. The method for producing each lubricant will be described in an item of Production Example below. Results of analysis conducted by the methods described below are shown in Table 1.

TABLE 1

| | Testing methods | Units | C1 (IPT-C$_5$ fraction copolymer) | C2 (IPT polymer) | C3 (IPT-IND copolymer) | W1 (Maleated C2/C3 copolymer) |
|---|---|---|---|---|---|---|
| | | | Composition | | | |
| | | | IPT 90 mass % | IPT 100 mass % | IPT 55 mass % | C2: 95 mass %, C3: 5 mass % |
| Mn (in terms of PS) | GPC method | | 900 | 800 | 1,200 | 1700 |
| Density | JIS K7112 | kg/m$^3$ | 1,030 | 1,020 | 1,080 | 920 |
| Acid value | JIS K0070 | mg-KOH/g | <0.1 | <0.1 | <0.1 | 60 |
| Softening point | JIS K2207 | °C. | 95 | 100 | 145 | 110 |
| Glass transition temperature (Tg) | JIS K7121 | °C. | 30 | 35 | 75 | −80 |
| Melt viscosity at 200° C. | B-type viscometer | mPa·s | 60 | 80 | 2,600 | — |
| Melt viscosity at 140° C. | B-type viscometer | mPa·s | — | — | — | 150 |
| Degree of unsaturation | $^1$H NMR | | 0.31 | 0.33 | 0.41 | 0.00 |

In Table 1, "—" means that no data were obtained. "IPT" denotes isopropenyltoluene or a structural unit derived from isopropenyltoluene, "IND" denotes indene or a structural unit derived from indene, "C2" denotes ethylene or a structural unit derived from ethylene, and "C3" denotes propylene or a structural unit derived from propylene.

<Composition of Polymer>

The contents (mass ratios) of structural units constituting lubricants C1 to C3 were each determined from the ratio of the corresponding component supplied for polymerization to the total amount of the supplied monomers. The amounts of structural units constituting polymer W1 (the composition ratios of ethylene and propylene) were determined by the analysis of a $^{13}$C-NMR spectrum measured under the following conditions.

<Conditions of $^{13}$C-NMR Measurement>

Apparatus: AVANCE III cryo-500, a nuclear magnetic resonance apparatus manufactured by Bruker BioSpin
Measured nucleus: $^{13}$C (125 MHz)
Measurement mode: Single-pulse proton broadband decoupling
Pulse width: 45° (5.00 μsec)
Number of points: 64 k
Measurement range: 250 ppm (−55 to 195 ppm)
Repetition time: 5.5 seconds
Cumulative number: 128
Measurement solvent: o-dichlorobenzene/benzene-d$_6$ (4/1 (volume ratio))
Sample concentration: 60 mg/0.6 mL
Measurement temperature: 120° C.
Window function: Exponential (BF: 1.0 Hz)
Chemical shift reference: δδ signal, 29.73 ppm <Number-Average Molecular Weight (Mn)>

For C1 to C3, the number-average molecular weight (Mn) was determined by GPC measurement. The measurement was conducted under the following conditions. The number-average molecular weight (Mn) and weight-average molecular weight (Mw) were determined from a calibration curve created using commercially-sold monodisperse polystyrene standards, and Mw/Mn was calculated.

Apparatus: GPC HLC-8320 (manufactured by Tosoh Corporation)
Solvent: Tetrahydrofuran
Column: TSKgel G7000×1, TSKgel G4000×2, and TSKgel G2000×1 (all of which are manufactured by Tosoh Corporation)
Flow rate: 1.0 ml/min
Sample: 20 mg/mL tetrahydrofuran solution
Temperature: Room temperature The number-average molecular weight Mn was determined also for W1 by GPC measurement. The measurement was conducted under the following conditions. The number-average molecular weight (Mn) and weight-average molecular weight (Mw) were determined from a calibration curve created using commercially-sold monodisperse polystyrene standards, and Mw/Mn was calculated.

Apparatus: gel permeation chromatograph, Alliance GPC 2000 (manufactured by Waters)
Solvent: o-dichlorobenzene
Column: TSKgel GMH6-HT×2 and TSKgel GMH6-HTL×2 columns (both manufactured by Tosoh Corporation)
Flow rate: 1.0 ml/min
Sample: 0.15 mg/mL o-dichlorobenzene solution
Temperature: 140° C.

<Density>

The density was measured according to JIS K7112 (density-gradient tube method).

<Acid Value>

The acid value was measured according to JIS K5902. It is noted that an acid value of 11 mgKOH/g is converted into a content of a polar group of 1 mass %.

<Softening Point>

The softening point was measured according to JIS K2207.

<Glass Transition Temperature (Tg)>

A sample was heated to 200° C., then crystalized by cooling to −20° C. at a rate of 10° C./min, and then heated again at a rate of 10° C./min. A DSC curve obtained during this process was analyzed according to JIS K7121 to determine the glass transition temperature.

<Melt Viscosity>

The melt viscosity was measured using a B-type digital viscometer manufactured by Brookfield; the sample amount was about 8 g, and the measurement temperature was 200° C. for C1 to C3 and 140° C. for W1.

<Degree of Unsaturation>

The degree of unsaturation was calculated through $^1$H-NMR measurement as follows. About 0.10 g of a sample was dissolved in 3.0 ml of deuterated chloroform. This solution was filtered through a glass filter and then charged into an NMR tube with an inner diameter of 10 mm. Subsequently, $^1$H-NMR was measured using ECX 400P, a nuclear magnetic resonance apparatus manufactured by JEOL Ltd., at 50° C. (cumulative number: 128, chemical shift reference: chloroform, 7.24 ppm). The degree of unsaturation was calculated, based on the spectrum, from the ratio of the integrated intensities between 6.0 to 8.0 ppm representing the amount of hydrogen on unsaturated bonds and 0.0 to 4.0 ppm representing the amount of hydrogen on saturated bonds.

[Production Example 1] (Production of C1 (Isopropenyltoluene-$C_5$ Fraction Copolymer))

A mixture of isopropenyltoluene, a $C_5$ fraction obtained by thermal decomposition of petroleum naphtha, and dehydrated, purified toluene (total monomers/toluene=1/1 (volume ratio)), and boron trifluoride phenolate complex (phenol: 1.7 equivalents) 10-fold diluted with dehydrated, purified toluene were continuously supplied to a stirring blade-equipped first-stage autoclave having a net volume of 1270 ml, and were allowed to undergo a polymerization reaction at 5° C. The mass ratio between isopropenyltoluene and $C_5$ fraction (isopropenyltoluene/$C_5$ fraction) was 90/10, the rate of supply of the mixture of the monomers and toluene was 1.0 liter/hour, and the rate of supply of the diluted catalyst was 80 milliliters/hour.

The reaction mixture was transferred to a second-stage autoclave and allowed to continue the polymerization reaction at 5° C. Once the total residence time in the first-stage and second-stage autoclaves reached 1.8 hours, continuous discharge of the reaction mixture from the autoclave was started. Upon lapse of the time period three times the residence time (5.4 hours), 1 liter of the reaction mixture was collected, and the polymerization reaction was terminated. After the termination of polymerization, a 1N aqueous NaOH solution was added to the collected reaction mixture for deashing of the catalyst residue. Further, the resulting reaction mixture was washed with a large volume of water five times, and then the solvent and unreacted monomers were distilled off at reduced pressure using an evaporator. Thus, isopropenyltoluene-$C_5$ fraction copolymer (C1) was obtained.

[Production Example 2] (Production of C2 (Isopropenyltoluene Polymer))

A mixture of isopropenyltoluene and dehydrated, purified toluene (total monomer/toluene=1/1 (volume ratio)), and boron trifluoride phenolate complex (phenol: 1.7 equivalents) 10-fold diluted with dehydrated, purified toluene were continuously supplied to a stirring blade-equipped first-stage autoclave having a net volume of 1270 ml, and were allowed to undergo a polymerization reaction at 5° C. The rate of supply of the mixture of the monomer and toluene was 1.0 liter/hour, and the rate of supply of the diluted catalyst was 80 milliliters/hour.

The reaction mixture was transferred to a second-stage autoclave and allowed to continue the polymerization reaction at 5° C. Once the total residence time in the first-stage and second-stage autoclaves reached 2 hours, continuous discharge of the reaction mixture from the autoclave was started. Upon lapse of the time period three times the residence time (6 hours), 1 liter of the reaction mixture was collected, and the polymerization reaction was terminated. After the termination of polymerization, a 1N aqueous NaOH solution was added to the collected reaction mixture for deashing of the catalyst residue. Further, the resulting reaction mixture was washed with a large volume of water five times, and then the solvent and unreacted monomer were distilled off at reduced pressure using an evaporator. Thus, isopropenyltoluene polymer (C2) was obtained.

[Production Example 3] (Production of $C_3$ (Isopropenyltoluene-Indene Copolymer))

A mixture of isopropenyltoluene (IPT), indene (IND), and dehydrated, purified toluene (volume ratio: total monomers/toluene=1/1), and boron trifluoride phenolate complex (phenol: 1.6 equivalents) 10-fold diluted with dehydrated, purified toluene were continuously supplied to a stirring blade-equipped first-stage autoclave having a net volume of 1270 ml, and were allowed to undergo a polymerization reaction at 5° C. The mass ratio between isopropenyltoluene (IPT) and indene (IND) (IPT/IND) was 55/45, the rate of supply of the mixture of the monomers and toluene was 1.0 liter/hour, and the rate of supply of the diluted catalyst was 75 milliliters/hour.

The reaction mixture was transferred to a second-stage autoclave and allowed to continue the polymerization reaction at 5° C. Once the total residence time in the first-stage and second-stage autoclaves reached 2 hours, continuous discharge of the reaction mixture from the autoclave was started. Upon lapse of the time period three times the residence time, 1 liter of the reaction mixture was collected, and the polymerization reaction was terminated. After the termination of polymerization, a 1N aqueous NaOH solution was added to the collected reaction mixture for deashing of the catalyst residue. Further, the resulting reaction mixture was washed with a large volume of water five times, and then the solvent and unreacted monomers were distilled off at reduced pressure using an evaporator. Thus, isopropenyltoluene-indene copolymer (C3) was obtained.

[Production Example 4] (Production of Modified Olefin Wax W1)

1. Preparation of Catalyst

In a glass autoclave having an internal volume of 1.5 liters, 25 g of commercially available anhydrous magnesium chloride was suspended in 500 ml of hexane. The resultant was retained at 30° C., and 92 ml of ethanol was added thereto in a dropwise manner over 1 hour under stirring, and the resultant was further reacted for another 1 hour. After completing the reaction, 93 ml of diethylaluminum monochloride was added thereto in a dropwise manner over 1 hour, and the resultant was reacted for another 1 hour. After completing the reaction, 90 ml of titanium tetrachloride was added thereto in a dropwise manner, and the temperature of the reaction vessel was increased up to 80° C. for performing a reaction for 1 hour. After completing the reaction, a solid portion was washed with hexane by decantation until free titanium could not be detected. The resultant was obtained as a hexane suspension, whose titanium concentration was quantitatively determined by titration, so as to be used in an experiment described below.

2. Production of Ethylene/propylene Copolymer (Unmodified Olefin Wax c1)

A sufficiently nitrogen-substituted autoclave of stainless steel having an internal volume of 2 liters was charged with 930 ml of hexane and 70 ml of propylene, and hydrogen was introduced thereinto to obtain a pressure of 20.0 kg/cm² (gauge pressure). Subsequently, after the temperature within the system was increased to 170° C., 0.1 mmol of triethylaluminum, 0.4 mmol of ethylaluminum sesquichloride, and the hexane suspension of the solid obtained as described above were injected thereinto with ethylene so that the amount of a titanium component could be 0.008 mmol in terms of atoms, and thus polymerization was started.

Thereafter, merely ethylene was continuously supplied to retain a total pressure at 40 kg/cm² (gauge pressure), and the polymerization was performed at 170° C. for 40 minutes.

After stopping the polymerization by adding a small amount of ethanol to the system, unreacted portions of ethylene and propylene were purged. The thus obtained polymer solution was dried overnight at 100° C. under reduced pressure to obtain an ethylene/propylene copolymer.

3. Acid Modification 500 g of unmodified olefin wax (c1) was charged into a glass reactor, and was melted at 160° C. under a nitrogen atmosphere. Subsequently, 30 g of maleic anhydride and 3 g of di-t-butyl peroxide (hereinafter abbreviated as DTBPO) were continuously supplied to the reaction system (temperature: 160° C.) over 5 hours. Thereafter, the resultant was reacted by heating for another 1 hour, the resultant was deaerated in a melted state under 10 mmHg vacuum for 0.5 hours to remove a volatile component, and the resultant was cooled to obtain modified olefin wax W1.

proportions as shown in Table 2. It should be noted that no lubricant was added in Comparative Example 1.

A two roll mill (DY6-15, roll clearance: 0.7 mm) heated to 180° C. was used to knead 200 g of each of the thus obtained resin compositions over 5 minutes. Thereafter, the resin composition taken out in the shape of a sheet was compression molded into a plate shape having a size of 200 mm×200 mm×T 3 mm using a hot press (70 ton press, set temperature: 195° C., preheating time: 5 minutes, pressing time: 40 seconds, pressure: 15 MPa) and a cool press (30 ton press, cooling time: 2 minutes, pressure 15 MPa). An IZOD impact test piece (having a notch) was created by cutting.

(Evaluation of Resin Composition)

The obtained resin compositions were evaluated as follows. The results are shown in Table 2.

<Transparency (Haze)>

A 3-mm-thick test piece prepared by compression molding of the resin composition was subjected to transparency (haze) measurement using a haze meter (NDH 2000 manufactured by Nippon Denshoku Industries Co., Ltd.).

<Heat Resistance>

A degree of coloring caused after the resin composition was kneaded for 5 minutes using the two roll mill was visually checked and evaluated as follows:

1: The resin composition is little yellowed as compared with its color immediately after starting the kneading.
2: The resin composition is rather yellowed as compared with its color immediately after starting the kneading.
3: The resin composition is severely yellowed as compared with its color immediately after starting the kneading.

<Impact Resistance>

IZOD impact strength was measured according to ASTM D256 (method A).

TABLE 2

| | | Units | Example 1 | Example 2 | Example 3 | Example 4 | Example 5 | Comparative Example 1 | Comparative Example 2 |
|---|---|---|---|---|---|---|---|---|---|
| Raw materials | Vinyl chloride-based resin (A) | Parts by mass | 100 | 100 | 100 | 100 | 100 | 100 | 100 |
| | Rubber-based impact absorber (B) | Parts by mass | 6 | 6 | 6 | 6 | 6 | 6 | 6 |
| | Stabilizer | Parts by mass | 3 | 3 | 3 | 3 | 3 | 3 | 3 |
| Lubricant | C1 | Parts by mass | 2 | | | | | | |
| | C2 | Parts by mass | | 2 | 1 | 3 | | | |
| | C3 | Parts by mass | | | | | 2 | | |
| | W1 | Parts by mass | | | | | | | 2 |
| Density ratio | (A)/(C) | — | 1.52 | 1.54 | 1.54 | 1.54 | 1.45 | — | 1.71 |
| | (B)/(C) | — | 0.97 | 0.98 | 0.98 | 0.98 | 0.93 | — | 1.09 |
| Transparency | Haze | % | 23.0 | 20.6 | 10.7 | 23.4 | 24.5 | 26.1 | 27.1 |
| Heat resistance | Yellowing (visual inspection) | — | 2 | 2 | 1 | 1 | 3 | 3 | 2 |
| Impact resistance | IZOD impact strength | J/m | 35.5 | 34.9 | 36.0 | 35.2 | 33.3 | 35.5 | 84.0 |

Examples 1 to 5 and Comparative Examples 1, 2

(Preparation of Resin Composition)

Together with 100 parts by mass of vinyl chloride-based resin (A) (chlorinated vinyl chloride), rubber-based impact absorber (B) (MBS), any of the lubricants, and a stabilizer, AT-1000 (mercapto tin-based stabilizer) manufactured by Nitto Kasei Co., Ltd., were charged into a plastic bag at one time and dry-blended in mass It is seen that Examples 1 to 5 exhibited a lower haze and hence higher transparency than Comparative Examples 1 and 2. Examples 1 to 4, in which C1 or C2 having a melt viscosity at 200° C. falling within a more preferred range was used as lubricant (C), exhibited more excellent heat resistance than Example 5. It is inferred that the preventive effect on thermal decomposition of vinyl chloride-based resin (A) was higher due to the melt viscosity falling within the more preferred range.

The present application is based upon and claims the benefit of priority of the prior Japanese Patent Application No. 2017-018924, filed on Feb. 3, 2017, the entire contents of which are incorporated herein by reference.

INDUSTRIAL APPLICABILITY

The resin composition of the present invention not only has excellent impact resistance attributed to the vinyl chloride-based resin but also is excellent in transparency, and can be suitably used for applications such as, in particular, a pipe joint.

The invention claimed is:

1. A resin composition, comprising 3 to 15 parts by mass of rubber-based impact absorber (B) and 0.1 to 10 parts by mass of lubricant (C) with respect to 100 parts by mass of vinyl chloride-based resin (A), and satisfying the following requirements (I) to (III):
 (I) the vinyl chloride-based resin (A) has a chlorine content of 55 to 75 mass %;
 (II) the rubber-based impact absorber (B) has a glass transition temperature (Tg), measured by differential scanning calorimetry (DSC), of 0° C. or less; and
 (III) the lubricant (C) satisfies the following requirements (i) to (iv):
  (i) a melt viscosity at 200° C. is 5 to 5,000 mPa·s;
  (ii) a softening point is in a range of 60 to 180° C.;
  (iii) a glass transition temperature (Tg) measured with a differential scanning calorimeter (DSC) is in a range of 0 to 100° C.; and
  (iv) in a molecule, a structural unit derived from at least one selected from the group consisting of styrene, α-methylstyrene, indene, vinyltoluene, and isopropenyltoluene is contained in an amount of 50 to 100 mass %,
 wherein the resin composition is molded into a pipe joint.

2. The resin composition according to claim 1, wherein the chlorine content in the vinyl chloride-based resin (A) is 60 to 75 mass % in the requirement (I).

3. The resin composition according to claim 1, wherein the rubber-based impact absorber (B) contains a rubber component selected from a butadiene rubber, an acrylic rubber and a silicone rubber.

4. The resin composition according to claim 1, wherein a content of the lubricant (C) is 0.1 to 3 parts by mass with respect to 100 parts by mass of the vinyl chloride-based resin (A).

5. The resin composition according to claim 1, wherein the melt viscosity at 200° C. is 5 to 2,000 mPa·s in the requirement (i) as to the lubricant (C).

6. The resin composition according to claim 1, wherein a ratio of a density of the vinyl chloride-based resin (A) to a density of the lubricant (C) ((A)/(C)) is 1.70 or less, and a ratio of a density of the rubber-based impact absorber (B) to the density of the lubricant (C) ((B)/(C)) is 1.05 or less.

7. The molded article according to claim 1, wherein the molded article is an injection-molded article.

8. The molded article according to claim 1, wherein the molded article has a minimum thickness of 1 mm or more.

* * * * *